US 9,315,128 B2

(12) United States Patent
Lorey

(10) Patent No.: US 9,315,128 B2
(45) Date of Patent: Apr. 19, 2016

(54) VEHICLE SEAT AND COMMERCIAL VEHICLE WITH AT LEAST ONE VEHICLE SEAT

(71) Applicant: GRAMMER AG, Amberg (DE)

(72) Inventor: Konstantin Lorey, Schmidgaden (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/314,582

(22) Filed: Jun. 25, 2014

(65) Prior Publication Data
US 2015/0001909 A1    Jan. 1, 2015

(30) Foreign Application Priority Data
Jun. 26, 2013    (DE) .......................... 10 2013 106 708

(51) Int. Cl.
| B60N 2/46 | (2006.01) |
| B60N 2/02 | (2006.01) |
| B60N 2/24 | (2006.01) |
| B60N 2/235 | (2006.01) |

(52) U.S. Cl.
CPC *B60N 2/464* (2013.01); *B60N 2/02* (2013.01); *B60N 2/236* (2015.04); *B60N 2/24* (2013.01)

(58) Field of Classification Search
CPC ............ B60N 2/464; B60N 2/02; B60N 2/24; B60N 2/236
USPC ........................... 297/411.33, 411.38, 411.36
See application file for complete search history.

(56) References Cited

U.S. PATENT DOCUMENTS

| 4,244,623 | A | * | 1/1981 | Hall et al. ................. 297/411.36 |
| 4,307,913 | A | * | 12/1981 | Spiegelhoff ............. 297/411.33 |

(Continued)

FOREIGN PATENT DOCUMENTS

| CN | 102774299 | 11/2012 |
| DE | 4042105 | 10/1992 |

(Continued)

OTHER PUBLICATIONS

Official Action (no English translation available) for German Patent Application No. 102013106708.5 dated Mar. 11, 2014, 2 pages.

(Continued)

*Primary Examiner* — Milton Nelson, Jr.
(74) *Attorney, Agent, or Firm* — Sheridan Ross, P.C.

(57) ABSTRACT

The invention relates to a vehicle seat with a seat part, with a backrest and with a height-adjustable armrest, in which the height-adjustable armrest has an arm support part and a lever mechanism to lift or lower the arm support part with a stationary base component, with one or two pivot lever parts articulated to the base component and with a height-adjustable lower component articulated to the pivot lever parts to carry the arm support part, wherein the height-adjustable armrest is distinguished by a locking device to lock the lever mechanism with a first locking part arranged on the side of the base component and having a first locking tooth system, with a second locking part arranged on the side of the lower component and having a further locking tooth system , and with locking means, which are displaceably arranged in relation to the two locking parts by means of an actuating element in such a way that counter-locking tooth systems of the locking means can engage in the locking tooth systems of the locking parts or can disengage in order to lock or unlock the lever mechanism.

11 Claims, 5 Drawing Sheets

(56) References Cited

U.S. PATENT DOCUMENTS

| | | | |
|---|---|---|---|
| 4,311,338 A * | 1/1982 | Moorhouse | 297/411.36 |
| 4,828,323 A | 5/1989 | Brodersen et al. | |
| 5,292,097 A * | 3/1994 | Russell | 248/281.11 |
| 5,743,595 A | 4/1998 | Kirdulis | |
| 7,980,631 B2 | 7/2011 | Diffrient | |
| 8,132,861 B2 | 3/2012 | Cone | |
| 8,950,816 B2 | 2/2015 | Ott et al. | |
| 2002/0096928 A1 | 7/2002 | Bidare | |
| 2010/0194168 A1 | 8/2010 | Titz | |
| 2011/0236130 A1 * | 9/2011 | Klein et al. | 404/83 |

FOREIGN PATENT DOCUMENTS

| | | |
|---|---|---|
| DE | 102005006977 | 2/2013 |
| DE | 202013103009 | 7/2013 |
| EP | 1676744 | 7/2006 |
| EP | 1676774 A1 * | 7/2006 |
| GB | 2170099 | 7/1986 |
| JP | 2006-336818 | 12/2006 |

OTHER PUBLICATIONS

U.S. Appl. No. 14/685,907, filed Apr. 14, 2015, Lorey.
European Search Report (no English translation available) for European Patent Application No. 13196759.8 dated Apr. 14, 2014, 6 pages.
Examination Report prepared by the German Patent Office on Feb. 11, 2015, for German Application No. 102014005620.1, 3 pages (no English translation available).
Official Action for U.S. Appl. No. 14/109,372, mailed Aug. 27, 2014 10 pages.
Notice of Allowance for U.S. Appl. No. 14/109,372, mailed Dec. 3, 2014 9 pages.

* cited by examiner

VEHICLE SEAT AND COMMERCIAL VEHICLE WITH AT LEAST ONE VEHICLE SEAT

CROSS-REFERENCE TO RELATED APPLICATIONS

This application claims the benefit of German Patent Application No. DE 10 2013 106 708.5 filed Jun. 26, 2013, the entire disclosure of which is incorporated herein by reference.

FIELD

The invention relates to a vehicle seat with a seat part, with a backrest and with a height-adjustable armrest, in which the height-adjustable armrest has an arm support part and a lever mechanism to lift or lower the arm support part with a stationary base component, with one or two pivot lever parts articulated to the base component and with a height-adjustable lower component articulated to the pivot lever part(s) to carry the arm support part.

The invention moreover relates to a commercial vehicle, in particular an agricultural commercial vehicle, with at least one vehicle seat.

BACKGROUND

Generic vehicle seats with height-adjustable armrests of this type are already known from the prior art. Thus, for example, patent specification DE 10 2005 006 977 B4 teaches a height-adjustable armrest for a vehicle seat with a correspondingly configured pivot arm, by means of which an arm support of the armrest is height-adjustably arranged on the vehicle seat. The armrest is distinguished by a gas compression spring that is upwardly inclined in relation to a longitudinal axis of the pivot arm, in order to realise optimised cooperation between the gas compression spring and the pivot arm in a stable, space-saving and simple overall structure.

SUMMARY

The invention relates to a vehicle seat with a seat part, with a backrest and with a height-adjustable armrest, in which the height-adjustable armrest has an arm support part and a lever mechanism to lift or lower the arm support part with a stationary base component, with one or two pivot lever parts articulated to the base component and with a height-adjustable lower component articulated to the pivot lever part(s) to carry the arm support part.

The object of the invention is to develop generic vehicle seats equipped with a height-adjustable armrest and, in particular, to allow a more rapid height adjustment of the armrest with a structurally very small outlay.

The object of the invention is achieved by a vehicle seat with a seat part, with a backrest and with a height-adjustable armrest, in which the height-adjustable armrest has an arm support part and a lever mechanism to lift or lower the arm support part with a stationary base component, with one or two pivot lever parts articulated to the base component and with a height-adjustable lower component articulated to the pivot lever part(s) to carry the arm support part, the height-adjustable armrest being distinguished by a locking device to lock the lever mechanism with a first locking part arranged on the base component side and having a first locking tooth system, with a second locking part arranged on the lower component side and having a further locking tooth system, and with locking means, which are displaceably arranged in relation to the two locking parts by means of an actuating element in such a way that counter-tooth systems of the locking means can engage in the locking tooth systems of the locking parts or can disengage in order to lock or unlock the lever mechanism.

Owing to the locking device acting in this manner, a height adjustment can be structurally particularly easily carried out on the height-adjustable armrest.

The height-adjustable armrest is configured in such a way with respect to the lever mechanism that the arm support part is height-adjustable in relation to a frame of the vehicle seat. To this extent, in particular the arm support part is lifted or lowered in relation to the stationary base component of the lever mechanism.

The lever mechanism preferably comprises two pivot lever parts, by means of which the height-adjustable lower component of the arm support part is connected in an articulated manner to the stationary base component, the second pivot lever part being substantially used to stabilise the height-adjustable lower component so that the arm support part remains substantially horizontally oriented independently of the adjusted height.

With a corresponding configuration, a lever mechanism of this type can also be realised with only one pivot lever part. However, for reasons of stability and a simply constructed mechanism, two pivot lever parts of this type are ideally integrated in the lever mechanism in such a way that the articulation points between the two pivot lever parts and the base component on the one side and the height-adjustable lower component on the other side form a parallelogram. In this case, the base component, the two pivot lever parts and the height-adjustable lower component form the sides of the parallelogram linked with one another by the articulation points.

It is obvious that the components of the lever mechanism that can be pivoted in relation to one another and those that cannot be pivoted can be configured in virtually any desired manner in order to be able to provide a compact height-adjustable armrest on the vehicle seat. However, it is expedient if the components are in each case bent from a sheet metal construction and are movably connected to one another by the articulation points in such a way that they can at least partially be pushed into one another if the height-adjustable armrest is adjusted with respect to its height.

It is also obvious that the components of the locking device can be configured differently and arranged differently with respect to one another in order to be able to correspondingly easily act in a locking and unlocking manner with respect to the lever mechanism.

In order to be able to configure the locking device structurally particularly simply, it is advantageous if the actuating element comprises a cam part that can be rotated with a rotary axle and the locking means comprise locking sliding parts, which can be radially outwardly displaced with respect to this rotary axle and have the counter-locking tooth systems, the radially displaceable locking sliding parts and cam regions of the rotatable cam part being arranged with respect to one another in such a way that upon a rotation of the actuating element in a first rotational direction, the counter-locking tooth systems of the radially displaceable locking sliding parts can be brought into engagement with the locking tooth systems by the rotatable cam part.

Owing to a structure selected in this manner, the locking means can be mounted so as to be radially outwardly displaceable in a structurally simple manner. To this extent, a reliable locking of the locking device and likewise of the lever mechanism of the height-adjustable armrest can be achieved.

In order to therefore also just as easily be able to unlock the locking device and therefore also the lever mechanism of the height-adjustable armrest again, it is advantageous if the cam part comprises disengagement elements, which have an operative connection to the radially displaceable locking sliding parts in such a way that upon a rotation of the actuating element in a second rotational direction opposing the first rotational direction, the counter-locking tooth systems of the radially displaceable locking sliding parts can be disengaged by the rotatable cam part from the locking tooth systems. Furthermore, it is advantageous if the disengagement elements have contact faces, which interact with approach slopes of the radially displaceable locking sliding parts upon a rotation of the actuating element in the second rotational direction.

Owing to this interaction of the contact faces and the approach slopes, the radially displaceable locking sliding parts can easily also be radially inwardly displaced, in other words toward the rotary axle of the cam part, so the corresponding counter-locking tooth systems can be disengaged from the locking tooth systems. The lever mechanism can thus then be freely moved and, in particular, the arm support part can be height-adjusted.

The locking device may be constructed in a very compact manner if the disengagement elements are arranged radially further out than the cam regions and arranged offset with respect to the cam regions in the peripheral direction of the rotatable cam part.

So that the locking device can lock the lever mechanism in an operationally reliable manner in the normal state, it is advantageous if the outwardly displaceable locking sliding parts are arranged in a spring-preloaded manner in such a way that the counter-locking tooth systems are always kept in engagement with the locking tooth systems, at least for as long as the cam part is not manually rotated in the second rotational direction. A very favourable spring-preloading can also be achieved by a correspondingly spring-preloaded rotary axle or the cam part respectively.

The lever mechanism can absorb arm support forces acting on the arm support part without problems if the locking device is arranged in an interactive manner between the height-adjustable lower component and one of the pivot lever parts or between the base component and one of the pivot lever parts.

If the locking device acts between the height-adjustable lower component and one of the pivot lever parts, the actuating element can be reached particularly well by a person sitting on the vehicle seat, as it can change its height position with the height-adjustable lower component.

In this case, the first locking part arranged on the side of the base component can be fastened directly to the base component. The corresponding first locking tooth system can structurally still more favourably be formed directly by the base component.

Likewise, the second locking component arranged on the side of the lower component can be directly fastened to the height-adjustable lower component. The corresponding further locking tooth system can structurally substantially more simply be directly formed by the height-adjustable lower component.

If the locking device acts between the base component and one of the pivot lever parts, the actuating element can structurally easily alternatively also be stationarily arranged on the height-adjustable armrest.

In particular, a vertically upwardly directed height adjustment of the arm support part can be more easily preloaded if the height-adjustable armrest comprises a drive device with a drive element for the power-assisted height adjustment of the arm support part.

Although the lever ratios of the lever mechanism can be selected in such a way that a movement of the height-adjustable arm support part is possible without problems, a more comfortable height adjustment takes place, however, with the aid of a drive device, which comprises a gas spring element, for example, as the drive element.

A structurally very simple solution proposes that the drive element comprises a tension spring element. The tension spring element is integrated into the height-adjustable armrest here in such a way that the height-adjustable arm support part can be adjusted up and down in a virtually neutral manner with respect to forces.

A more comfortable but also more cost-intensive embodiment variant provides that the drive element comprises an electrically operated drive motor.

In order to be able to carry out a further improved adaptation of the height-adjustable armrest, it is advantageous if the height-adjustable lower component comprises a lower part and an upper part that is displaceable in relation to the lower part. As a result, the arm support part can be placed further forward or further to the rear transversely to the height adjustment and in the main seat direction, so a still more diverse arm support can be achieved.

The object of the invention is also achieved by a commercial vehicle, in particular an agricultural commercial vehicle, with at least one vehicle seat, the commercial vehicle or the agriculturally used commercial vehicle respectively being distinguished by a vehicle seat according to any one of the features disclosed here.

If the commercial vehicle, in particular the agriculturally used commercial vehicle, comprises the vehicle seat according to the invention, it can be advantageously achieved that the height adjustment to the armrest can be carried out substantially more easily by a person sitting on the vehicle seat. Therefore, the operation of the height-adjustable armrest also requires substantially less attention from this person, so a height adjustment of the arm support part deflects especially a vehicle driver of the commercial vehicle much less from his actual task, namely driving the vehicle. This reduces the danger of an accident quite considerably.

Further advantages, aims and properties of the present invention will be described with the aid of the accompanying drawings and the following description, in which, by way of example, a vehicle seat equipped with a locking device according to the invention is shown and described.

DETAILED DESCRIPTION

Figure 1:
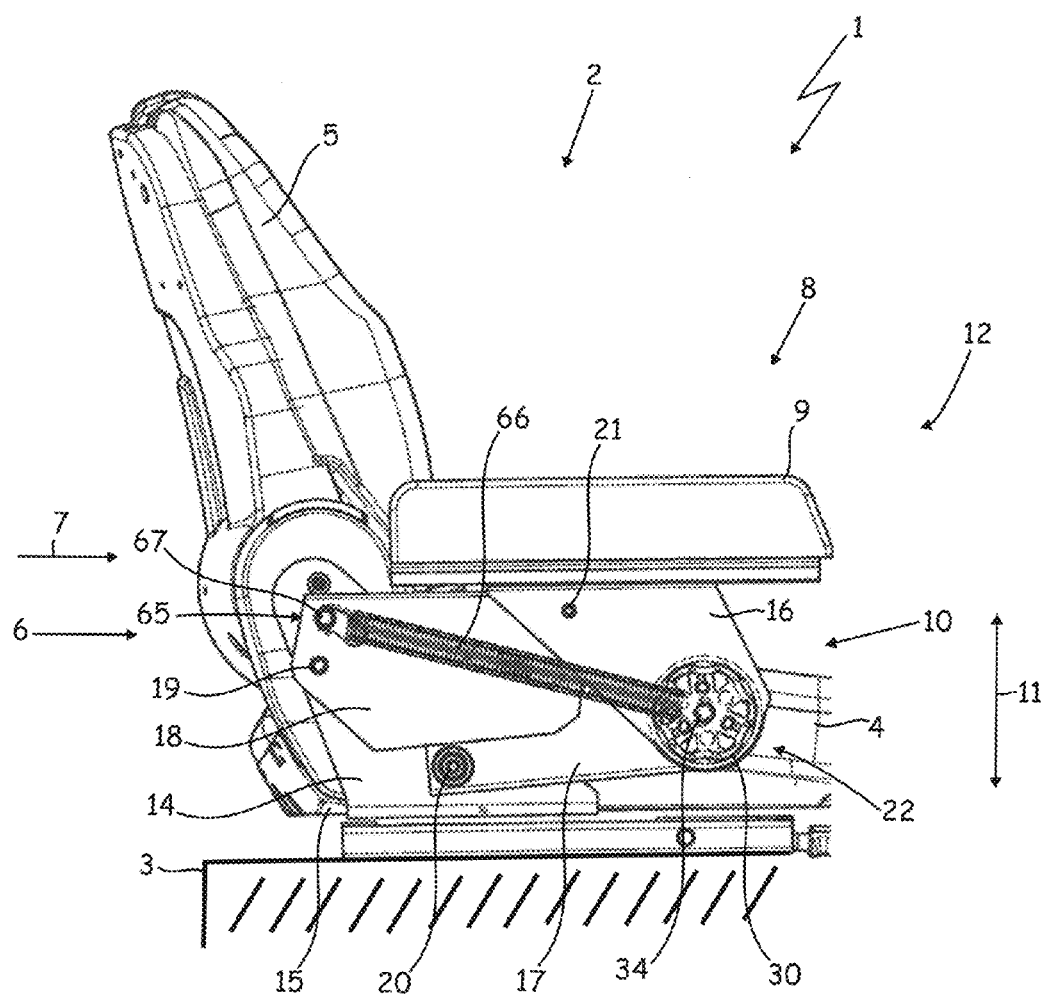
FIG. 1 schematically shows a first side view of a vehicle seat with a height-adjustable armrest, the lever mechanism of which can be locked or unlocked by means of a locking device that can be actuated by an actuating element.
Figure 2:
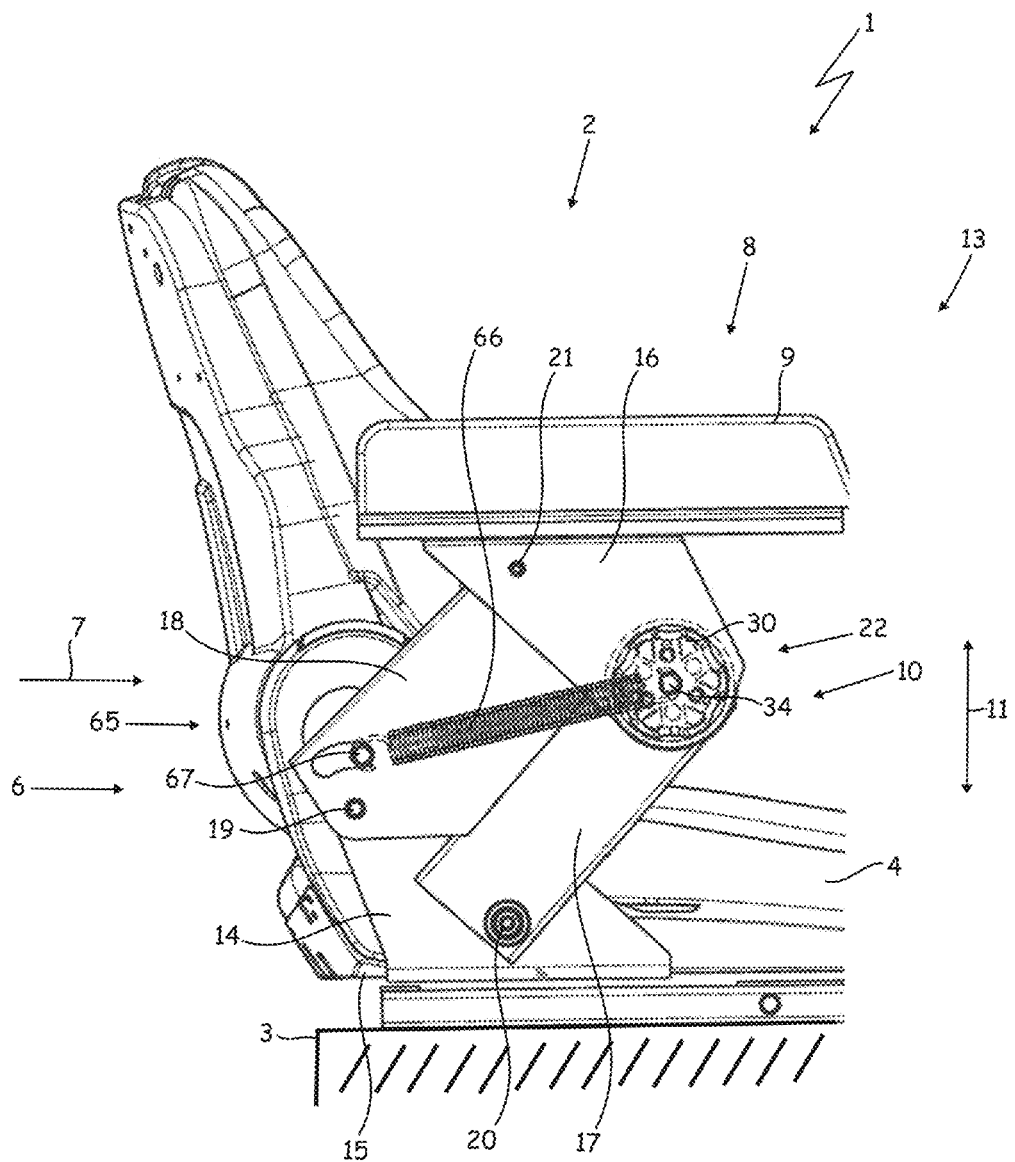
FIG. 2 schematically shows a further side view of the vehicle seat with an armrest adjusted vertically further upwardly.
Figure 3:
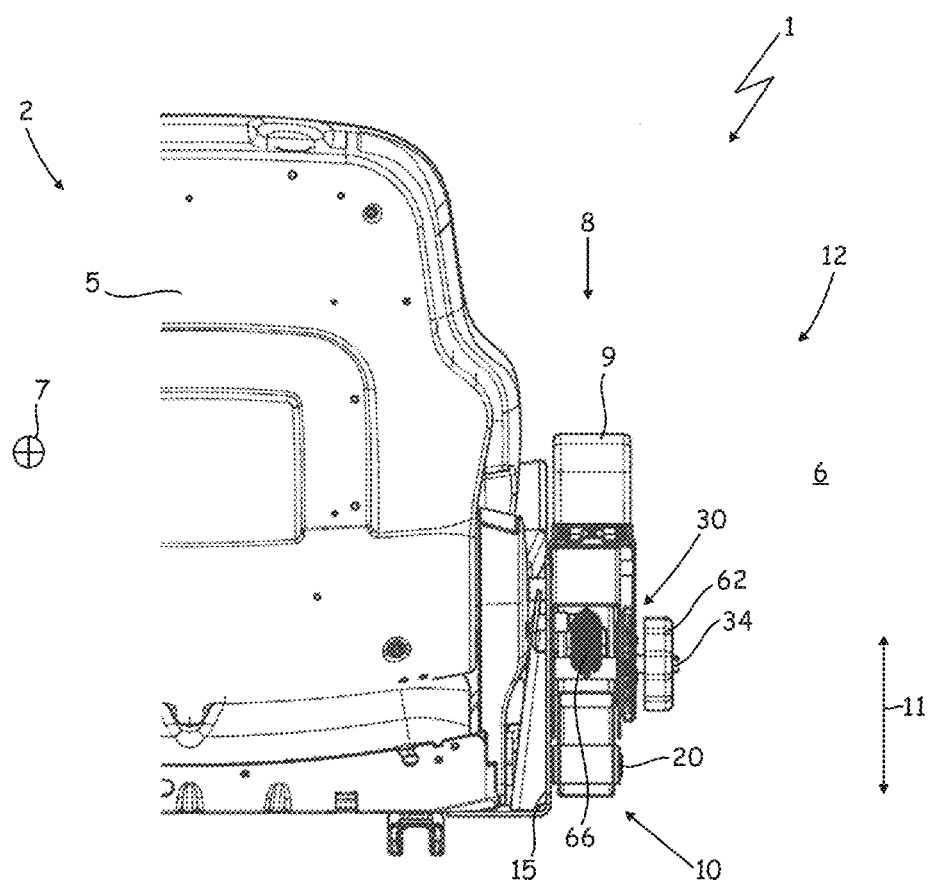
FIG. 3 schematically shows a rear view of the vehicle seat.

The vehicle seat 1 shown in FIGS. 1 to 3 is especially a commercial vehicle seat 2 of an agriculturally used commercial vehicle 3, not shown further here.

The vehicle seat 1 has a seat part 4, a backrest 5 and, viewed on its right-hand side 6 in the main travelling direction 7, a height-adjustable armrest 8 with an arm support part 9.

The height-adjustable armrest 8 has a lever mechanism 10, by means of which the arm support part 9 is height-adjustable in the vertical direction 11.

For example, the arm support part 9, according to the views of FIGS. 1 and 3, is shown in a lower arm support position 12 and, according to the view of FIG. 2, is shown in an upper arm support position 13.

The lever mechanism 10, in this embodiment, consists of a base component 14, which is stationarily fixed to a frame 15 of the vehicle seat 1.

Furthermore, the lever mechanism 10 comprises a lower component 16, which is height-adjustable in relation to this frame 15, to support or respectively carry the arm support part 9.

A first pivot lever part 17 and a second pivot lever part 18 are now mounted between the stationary base part 14 and the height-adjustable lower component 16 in such a way that the height-adjustable lower component 16 always remains oriented virtually horizontally upon movement in the vertical direction 11, so the arm support part 9 is also always oriented correspondingly horizontally to ensure high comfort of use for a passenger (not shown here) sitting on the vehicle seat 1.

The pivot lever parts 17 and 18 respectively are held articulated on the stationary base component 14 by means of bearing points 19 and 20 respectively. Accordingly, the two pivot lever parts 17 and 18 respectively are articulated by means of further bearing points 21 and 22 respectively on the height-adjustable lower component 16. These bearing points 19, 20, 21 and 22 respectively in each case form an articulation point, not separately provided with a reference numeral here, on the lever mechanism 10.

Figure 7:
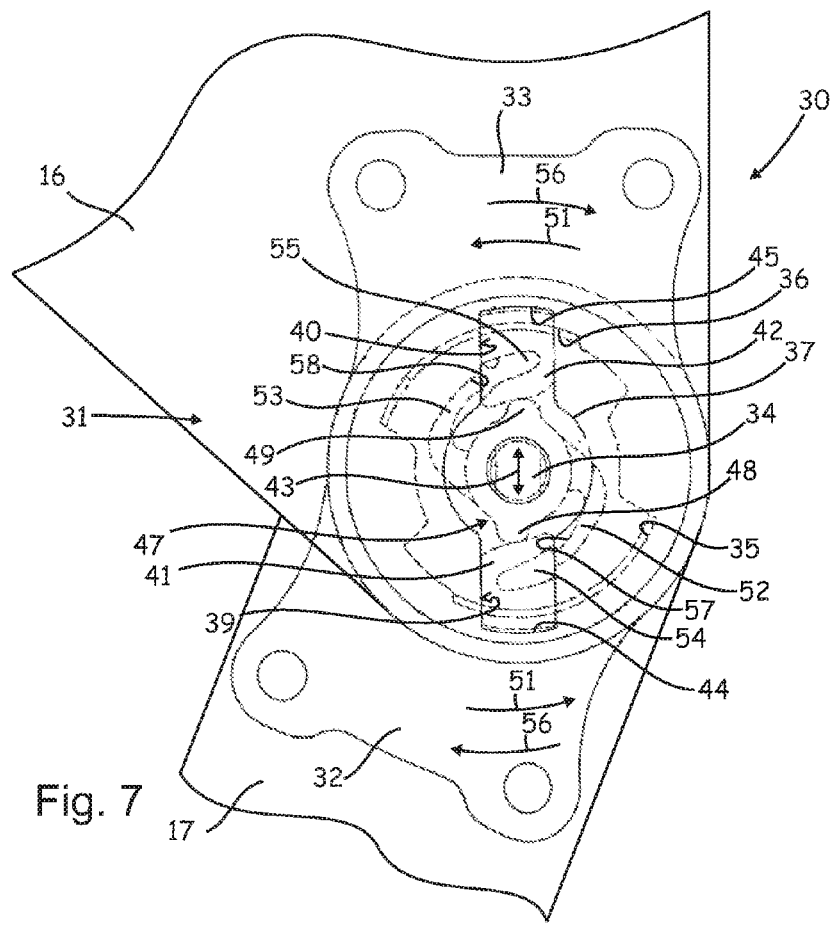
FIG. 7 schematically shows a part view of a first possible mechanism of the locking device.
Figure 8:
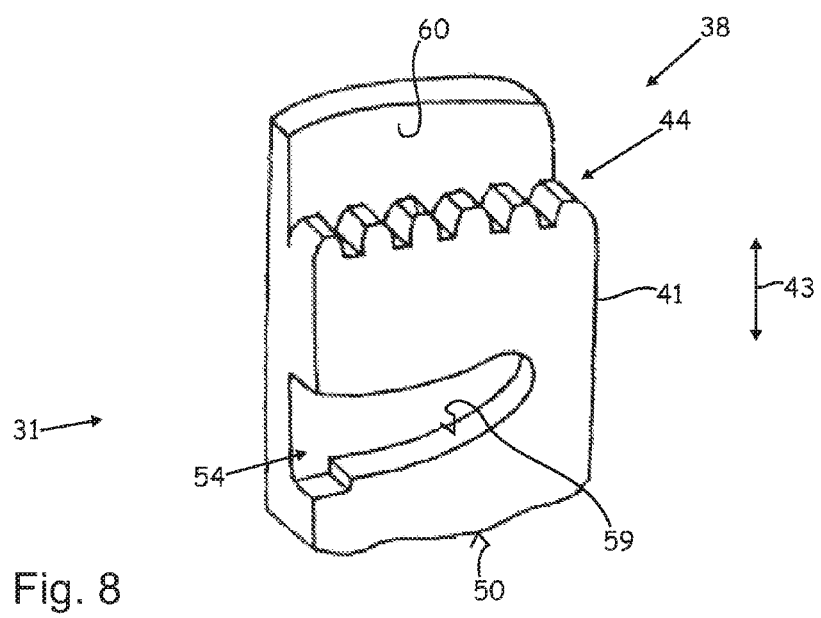
FIG. 8 schematically shows a view of a radially displaceable locking means of the mechanism shown in FIG. 5.

In order to be able to lock the lever mechanism 10 with respect to an undesired height adjustment in the vertical direction 11, the height-adjustable armrest 8 also comprises a locking device 30 (see also FIGS. 7 and 8).

A first possible mechanism 31 of this locking device 30 is explicitly shown according to the views of FIGS. 7 and 8, the locking device 30 comprising a first locking part 32 and a second locking part 33. The two locking parts 32 and 33 are rotatably movably mounted with respect to one another about a common rotary axle 34, the first locking part 32 being fixed by means of a screw connection, not shown here, on the first pivot lever part 17. Accordingly, the second locking part 33 is fixed by means of a screw connection, also not shown further, on the height-adjustable lower component 16.

Thus, the first locking part 32 is mounted substantially on the base component side and the second locking part 33 is mounted on the lower component side.

In any case, the locking device 30 in this embodiment is placed between the height-adjustable lower component 16 and the first pivot lever part 17.

The first locking part 32 comprises a first locking tooth system 35, which is directed toward the rotary axle 34 and extends in an arcuate manner at least partially about this rotary axle 34.

The second locking part 33 accordingly comprises a second locking tooth system 36, which opposes the first locking tooth system 35. The second locking tooth system 36 is also directed toward the rotary axle 34 and extends in an arcuate manner at least partially about the rotary axle 34.

An intermediate part 37 for mounting locking means 38 (see FIG. 8) is arranged between the two locking parts 32 and 33. The intermediate part 37 comprises two guide grooves 39 and 40, the first guide groove 39 opposing the first locking tooth system 35 and the second guide groove 40 opposing the second locking tooth system 36.

The locking means 38 in this embodiment comprise two locking sliding parts 41 and 42 (shown only by way of example here), the first locking sliding part 41 being displaceably mounted in the radial direction 43 in the first guide groove 39 radially with respect to the rotary axle 34, and the second locking sliding part 42 being correspondingly displaceably mounted in the radial direction 43 in the second guide groove 40 radially with respect to the rotary axle 34.

The locking means 38 and therefore also the two locking sliding parts 41 and 42 in each case have a counter-locking tooth system 44 and 45 respectively, which can be brought into engagement with the respective locking tooth system 35 and 36 respectively when the locking sliding parts 41 and 42 are pushed radially outwardly.

So that the locking sliding parts 41 and 42 can be structurally easily pushed radially outwardly so the counter-locking tooth systems 44 and 45 respectively can be engaged in the respectively corresponding locking tooth systems 35 and 36 respectively and, as a result, the two locking parts 32 and 33 are non-rotatably locked together, the locking device 30 also comprises an actuating element 46 in the form of a cam part 47 fixed on the rotary axle 34.

The cam part 47 forms two cams 48 and 49, which in each case correspond with a cam track 50 (only provided with a reference numeral by way of example, see FIG. 8) of the respective locking sliding part 41 or 42 respectively.

If the actuating element 46 or the cam part 47 respectively is now rotated in a first rotational direction 51, the cams 48 and 49 respectively come into operative contact with the respective cam track 50 of the locking sliding parts 41 or 42 in such a way that the locking sliding parts 41 and 42 respectively are in each case pressed radially outwardly by the cams 48 and 49 respectively.

As a result, the locking device 30 locks the lever mechanism 10 as a whole, so a height adjustment of the height-adjustable arm support part 9 is not possible and the armrest 8 can be fully loaded from above by bearing forces.

A permanent or automatic locking of the lever mechanism 10 respectively can be achieved in a structurally simple and operationally reliable manner in that the rotary axle 34 or the cam part 47 respectively is spring-preloaded in this first rotational direction 51, so the counter-locking tooth systems 44 and 45 respectively are automatically always engaged in the respectively corresponding locking tooth systems 35 and 36 respectively. Thus, the height-adjustable armrest 8 is locked in the normal state or in the use state of the vehicle seat 1 respectively.

If a height adjustment is now to be carried out on the height-adjustable armrest 8, the counter-locking tooth systems 44 and 45 respectively have to be disengaged from the respectively corresponding locking tooth systems 35 and 36 respectively. This takes place in a structurally very simple manner by means of disengagement elements 52 and 53 formed on the cam part 47. These disengagement elements 52 and 53 respectively are radially further out than the cams 48 and 49 on the periphery of the cam part 47 and also offset in the peripheral direction. The disengagement elements 52 and 53 respectively may correspond here with correspondingly formed material recesses 54 and 55 respectively of the locking sliding parts 41 and 42 respectively if the rotary axle 34 and therefore also the cam part 47 is rotated in a second rotational direction 56, which opposes the first rotational direction 51.

The disengagement elements 52, 53 form contact faces 57 and 58 respectively here, which, upon a rotation of the actuating element 46 in the second rotational direction 56, interact with correspondingly formed approach slopes 59 (only provided with a reference numeral by way of example here, see FIG. 8) of the radially displaceable locking sliding parts 41 and 42 respectively.

The disengagement elements 52 and 53 respectively engage in a particularly space-saving manner here in the material recesses 54 and 55 respectively.

To this extent, upon a rotation of the cam part 47 in the second rotational direction 56, the two cams 48 and 49 are removed from the respective cam track 50 of the locking sliding part 41 and 42 respectively, the contact faces 57 or 58 respectively of the disengagement elements 52 coming into contact, simultaneously or with a slight time delay, with the respective approach slope 59 formed on the corresponding locking sliding part 41 and 42 respectively in such a way that the locking sliding parts 41 and 42 respectively are displaced radially inwardly, in other words moved toward the rotary axle 34.

Formed laterally above the counter-locking tooth systems 44 or 45 respectively are also axial guide faces 60, by means of which an improved guidance of the locking sliding parts 41 or 42 respectively in the guide grooves 39 and 40 can be ensured.

Figure 4:
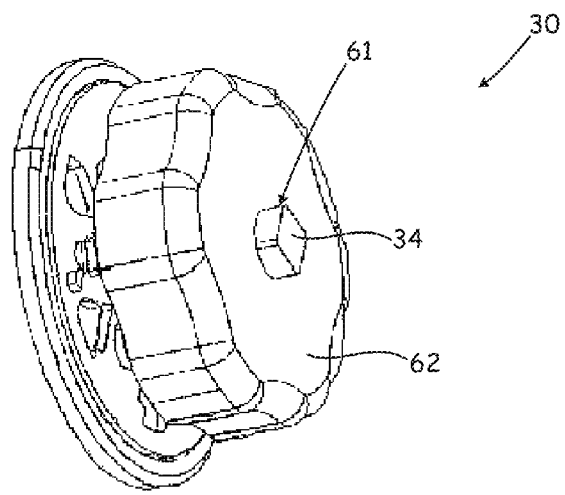
FIG. 4 schematically shows a model view of a locking device that can be actuated manually with a corresponding operating handle.

For easy rotation of the rotary axle 34, a rotary handle 62 (see FIGS. 3, 4 and 5) is placed on the end 61, which projects radially outwardly, of the rotary axle 34, it being possible to manually grip said rotary handle well and rotate it in the first rotational direction 51 or in the second rotational direction 56.

Moreover, the height-adjustable armrest 8 expediently also has a drive device 65 (see FIG. 6), by means of which a height adjustment can be carried out more easily on the armrest 8.

Figure 5:
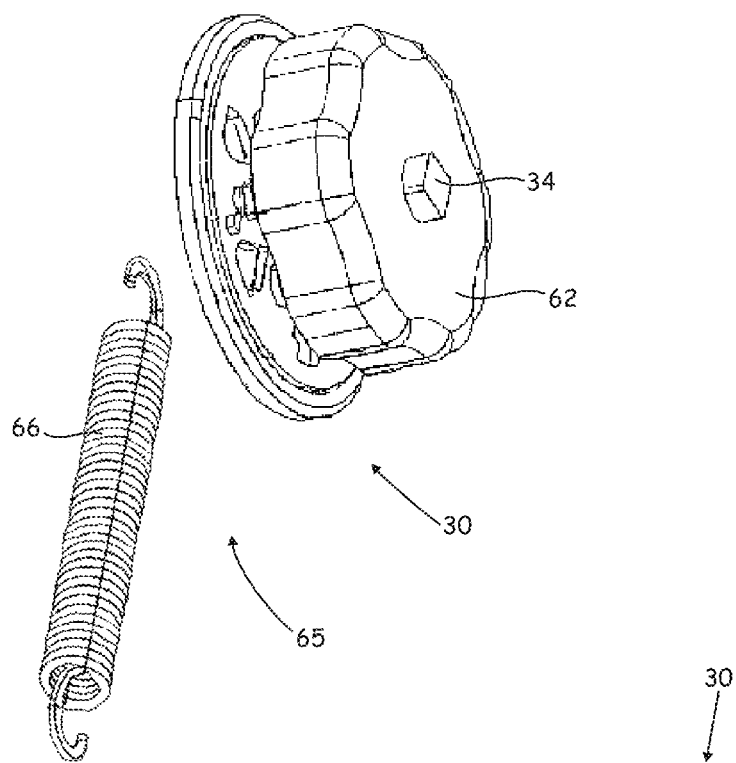
FIG. 5 schematically shows a further model view of the locking device that can be actuated manually from FIG. 4 in cooperation with a drive device comprising a tension spring element.

In this embodiment, the drive device 65 comprises a tension spring element 66, which is shown, in particular according to the view of FIG. 5, in conjunction with the locking device 30.

This tension spring element 66 is hooked, on the one hand, on a bolt 67 of the base component 14 and, on the other hand, in a suitable manner on the rotary axle 34 in such a way that the height-adjustable lower component 16 is always easily lifted up when the locking device is unlocked. As a result, a more comfortable adjustment of the height-adjustable armrest 8 is achieved.

Figure 6:
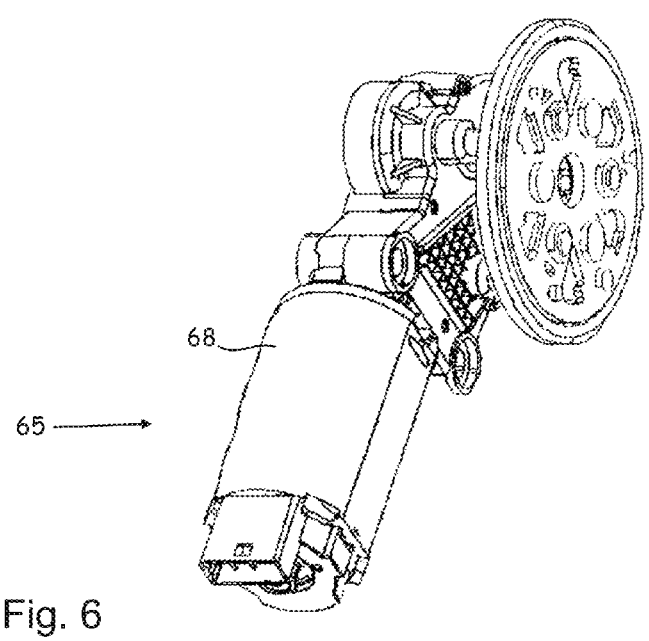
FIG. 6 schematically shows a model view of a motor-assisted locking device.

A still more comfortable adjustment can be achieved if the drive device 65 is alternatively equipped with an electric drive motor 68, as shown according to the view of FIG. 6.

It is obvious that the embodiment described above is only a first configuration of the vehicle seat according to the invention. To this extent, the configuration of the invention is not limited to this embodiment.

All the features disclosed in the application documents are claimed as being essential to the invention inasmuch as they are novel individually or in combination compared to the prior art.

LIST OF REFERENCE NUMERALS 1 vehicle seat
2 commercial vehicle seat
3 agricultural commercial vehicle
4 seat part
5 backrest
6 right-hand side
7 main travelling direction
8 height-adjustable armrest
9 arm support part
10 lever mechanism
11 vertical direction
12 lower arm support position
13 upper arm support position
14 base component
15 frame
16 height-adjustable lower component
17 first pivot lever part
18 second pivot lever part
19 first bearing point
20 second bearing point
21 third bearing point
22 fourth bearing point
30 locking device
31 first possible mechanism
32 first locking part
33 second locking part
34 rotary axle
35 first locking tooth system
36 second locking tooth system
37 intermediate part
38 locking means
39 first guide groove
40 second guide groove
41 first locking sliding part
42 second locking sliding part
43 radial direction
44 first counter-locking tooth system
45 second counter-locking tooth system
46 actuating element
47 cam part
48 first cam
49 second cam
50 cam track
51 first rotational direction
52 first disengagement element
53 second disengagement element
54 first material recess
55 second material recess
56 second rotational direction
57 first contact face
58 second contact face
59 approach slopes
60 axial guide faces
61 end
62 rotary handle
65 drive device
66 tension spring element
67 bolt
68 drive motor

What is claimed is:

1. A vehicle seat, comprising:
    a seat part;
    a backrest; and
    a height-adjustable armrest, including:
        an arm support part;
        a lever mechanism to lift or lower the arm support part;
        a stationary base component;
        at least one pivot lever part articulated to the base component;
        a height-adjustable lower component articulated to the at least one pivot lever part to carry the arm support part; and
        a locking device, including:
            a first locking part, wherein the first locking part is fixed to the at least one pivot lever part, and wherein the first locking part includes a first locking tooth system;
            a second locking part, wherein the second locking part is fixed to the height-adjustable lower component, and wherein the second locking part includes a second locking tooth system; and
            first and second locking sliding parts, wherein the first and second locking sliding parts are displaceably arranged in relation to the first and second locking parts by an actuating element in such a way that a counter-locking tooth system of the first locking sliding part can engage in the locking tooth system of the first locking part or can disengage from the locking tooth system of the first locking part and a counter-locking tooth system of the second locking sliding part can engage in the locking tooth system of the second locking part or can disengage from the locking tooth system of the second locking part in order to lock or unlock the lever mechanism.

2. A commercial vehicle, in particular an agricultural commercial vehicle, with at least one vehicle seat, according to claim 1.

3. The vehicle seat according to claim 1, wherein the locking device is arranged in an interactive manner between the height-adjustable lower component and one of the pivot lever parts or between the base component and one of the pivot lever parts.

4. The vehicle seat according to claim 1, further comprising a drive device with a drive element for power-assisted height adjustment of the arm support part.

5. The vehicle seat according to claim 4, wherein the drive element comprises a tension spring element.

6. The vehicle seat according to claim 4, wherein the drive element comprises an electrically operated drive motor.

7. The vehicle seat according to claim 1, wherein the actuating element comprises a cam part that can be rotated with a rotary axle, wherein the locking sliding parts can be outwardly displaced radially with respect to the rotary axle by two cams formed by the cam part, wherein the radially displaceable locking sliding parts and the cams of the rotatable cam part are arranged in relation to one another in such a way that upon a rotation of the actuating element in a first rotational direction, the counter-locking tooth systems of the radially displaceable locking sliding parts can be brought into engagement with the locking tooth systems by the rotatable cam part.

8. The vehicle seat according to claim 7, wherein the outwardly displaceable locking sliding parts are arranged spring-preloaded in such a way that the counter-locking tooth systems are always kept in engagement with the locking tooth systems.

9. The vehicle seat according to claim 7, wherein the cam part comprises disengagement elements, which have an operative connection to the radially displaceable locking sliding parts in such a way that upon a rotation of the actuating element in a second rotational direction opposing the first rotational direction, the counter-locking tooth systems of the radially displaceable locking sliding parts can be disengaged from the locking tooth systems by the rotatable cam part.

10. The vehicle seat according to claim 9, wherein the disengagement elements have contact faces, which, upon a rotation of the actuating element in the second rotational direction, interact with approach slopes of the radially displaceable locking sliding parts.

11. The vehicle seat according to claim 9, wherein the disengagement elements are arranged further out than the cams and offset with respect to the cams in the peripheral direction of the rotatable cam part.

* * * * *